US00RE49612E

(19) United States
(12) Reissued Patent
Durand et al.

(10) Patent Number: US RE49,612 E
(45) Date of Reissued Patent: Aug. 15, 2023

(54) SYSTEM FOR GENERATING THE MOVEMENT OF A SUPPORT PLATE IN SIX DEGREES OF FREEDOM

(71) Applicant: Micro-Contrôle-Spectra-Physics SAS, Beaune-la-Rolande (FR)

(72) Inventors: Eric Durand, Amilly (FR); Bruno Rety, Bouzy la Florét (FR)

(73) Assignee: MICRO-CONTRÔLE—SPECTRA-PHYSICS SAS, Evry (FR)

(21) Appl. No.: 17/411,973

(22) Filed: Aug. 25, 2021

Related U.S. Patent Documents

Reissue of:
(64) Patent No.: 10,393,308
Issued: Aug. 27, 2019
Appl. No.: 16/067,810
PCT Filed: Dec. 30, 2016
PCT No.: PCT/FR2016/053686
§ 371 (c)(1),
(2) Date: Jul. 2, 2018
PCT Pub. No.: WO2017/118797
PCT Pub. Date: Jul. 13, 2017

(30) Foreign Application Priority Data

Jan. 6, 2016 (FR) ..... 1650094

(51) Int. Cl.
*F16M 11/04* (2006.01)
*F16M 11/12* (2006.01)

(52) U.S. Cl.
CPC ..... *F16M 11/046* (2013.01); *F16M 11/121* (2013.01); *F16M 11/125* (2013.01)

(58) Field of Classification Search
CPC ... F16M 11/046; F16M 11/121; F16M 11/125
(Continued)

(56) References Cited

U.S. PATENT DOCUMENTS 3,142,521 A * 7/1964 Petroff ..... B23Q 1/015 108/20
3,155,383 A * 11/1964 Whitmore ..... B23Q 1/38 108/143

(Continued)

FOREIGN PATENT DOCUMENTS

CN 103381601 A 11/2013
DE 19951919 C2 12/2001

(Continued)

OTHER PUBLICATIONS

The International Search Report dated Feb. 20, 2017 to International Application No. PCT/FR2016/053686 with 2 pages.

(Continued)

*Primary Examiner* — Russell D Stormer
(74) *Attorney, Agent, or Firm* — Edward Scott Trask

(57) ABSTRACT

The invention relates to a system (1) for moving a support plate (2), the support plate (2) being, in a so-called neutral position, substantially parallel to an XY plane defined by a so-called X direction and a so-called Y direction, [said] *the* system comprising at least two control stages (E1, E2) which are superimposed in a direction Z orthogonal to [said] *the* X and Y directions, the two control stages (E1, E2) being secured to each other, at least one of [said] *the* control stages (E1, E2) comprising a control module (M1, M2), the control module (M1, M2) comprising only movement units designed so as to each generate a translational movement in an XY plane, respectively in different directions.

22 Claims, 5 Drawing Sheets

(58) Field of Classification Search
USPC ..... 108/137, 138, 143
See application file for complete search history.

(56) References Cited

U.S. PATENT DOCUMENTS

| | | | | | |
|---|---|---|---|---|---|
| 4,607,578 | A * | 8/1986 | Inoue | B23P 19/00 | 108/145 |
| 4,934,647 | A * | 6/1990 | Edwards | F16M 11/2021 | 248/346.06 |
| 5,031,547 | A * | 7/1991 | Hirose | B23Q 1/4866 | 108/137 |
| 5,163,651 | A * | 11/1992 | Matsumoto | B23Q 1/38 | 108/20 |
| 5,228,358 | A * | 7/1993 | Sakino | B23Q 1/38 | 108/143 |
| 5,323,712 | A * | 6/1994 | Kikuiri | B23Q 1/48 | 108/138 |
| 5,613,403 | A * | 3/1997 | Takei | B23Q 1/621 | 108/143 |
| 5,685,232 | A * | 11/1997 | Inoue | A47B 85/00 | 108/20 |
| 5,794,541 | A * | 8/1998 | Hirose | B23Q 1/4866 | 108/20 |
| 6,077,078 | A | 6/2000 | Alet et al. | | |
| 6,405,659 | B1 * | 6/2002 | Hazelton | G03F 7/70716 | 108/20 |
| 6,408,767 | B1 * | 6/2002 | Binnard | F16C 29/025 | 108/147 |
| 6,681,703 | B2 * | 1/2004 | Wells | A61C 9/0093 | 108/1 |
| 6,891,601 | B2 | 5/2005 | Jeanne et al. | | |
| 7,451,710 | B2 * | 11/2008 | Arai | H02K 41/03 | 108/20 |
| 8,575,791 | B2 * | 11/2013 | Jywe | B23K 26/0853 | 108/138 |
| 9,739,414 | B2 * | 8/2017 | Hung | F16M 11/043 | |
| 10,073,043 | B2 | 9/2018 | Jeanne et al. | | |
| 10,393,308 | B2 * | 8/2019 | Durand | F16M 11/2014 | |
| 2004/0129856 | A1 | 7/2004 | Ueno | | |
| 2004/0144288 | A1 * | 7/2004 | Chiang | G09B 9/02 | 108/1 |
| 2004/0187743 | A1 * | 9/2004 | Kanehira | B23Q 1/44 | 108/20 |
| 2007/0119347 | A1 * | 5/2007 | Yamazaki | B23Q 1/60 | 108/20 |
| 2008/0043325 | A1 * | 2/2008 | Ue | G02B 21/26 | 359/393 |
| 2011/0219990 | A1 * | 9/2011 | Saito | B41F 3/51 | 108/20 |
| 2012/0301067 | A1 * | 11/2012 | Morgan | F16M 11/041 | 384/590 |
| 2013/0112118 | A1 * | 5/2013 | Deyhim | G01M 11/04 | 108/138 |
| 2015/0308921 | A1 | 10/2015 | Warmerdam et al. | | |

FOREIGN PATENT DOCUMENTS

| | | | |
|---|---|---|---|
| EP | 0946843 | B1 | 5/2002 |
| EP | 1501065 | A1 | 1/2005 |
| EP | 2584551 | A1 | 4/2013 |
| EP | 2816723 | A1 | 12/2014 |
| FR | 2757925 | A1 | 7/1998 |
| JP | 2757925 | B2 | 5/1998 |
| JP | 2004156679 | A | 6/2004 |
| JP | 20044195620 | A | 7/2004 |
| JP | 2004301256 | A | 10/2004 |
| JP | 2005140185 | A | 6/2005 |
| JP | 2012051054 | A | 3/2012 |
| KR | 20000062338 | A | 10/2000 |

OTHER PUBLICATIONS

The Written Opinion issued to International Application No. PCT/FR2016/053686 dated Feb. 20, 2017, 5 pages.
The Chinese office action dated Oct. 29, 2019 and Chinese search report dated Oct. 11, 2019 to Chinese Application No. 201680079988.2 with a total of 11 pages.
The Written Opinion on Patentability dated Nov. 8, 2016 by the France Patent Office, and the Preliminary Search Report dated Nov. 3, 2016 by the France Patent Office, for French Patent Application No. 1650094, with a total of 11 pages.
International Search Report and Written Opinion dated Feb. 20, 2017, issued in corresponding International Application No. PCT/FR2016/053686, filed Dec. 30, 2016, 4 pages.

* cited by examiner

SYSTEM FOR GENERATING THE MOVEMENT OF A SUPPORT PLATE IN SIX DEGREES OF FREEDOM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*The present application is a reissue application of U.S. Pat. No. 10,393,308 issued Aug. 27, 2019 from U.S. patent application Ser. No. 16/067,810 filed on Jul. 2, 2018, entitled "System for Generating the Movement of a Support Plate in Six Degrees of Freedom", which is a National Stage Entry of Patent Cooperation Treaty Application No. PCT/FR2016/053686, entitled "System for Generating the Movement of a Support Plate in Six Degrees of Freedom," which claims priority to French Patent Application No. FR1650094, filed on Jan. 6, 2016 entitled "Systéme de Génération de Déplacement D'une Plaque de Support Selon Six Degrés de Liberté," the contents all of which are hereby incorporated by reference in their entirety herein.*

This invention relates to a system for generating movement of a support plate in several degrees of freedom.

This system has for purpose to allow for the relative movement between two plates, a support plate (or platform) which is able to carry an optical, mechanical or other device, in order to take measurements, processing, etc., and a lower plate which is placed on a support element, for example on a workstation.

In order to generate such a movement in the six degrees of freedom possible, a positioner of the hexapod type is known, which is a parallel robot constituted of six actuators forming legs. The six legs are actuated in order to change the length and vary the orientation of the upper platform. As such, a set of unique leg lengths is associated to a given position of the upper platform.

Systems of the parallel robot type, in particular hexapods, generally have disadvantages, and in particular a substantial encumbrance and/or a limited area of work.

Moreover, it is known through document FR-2 757 925, a modular device for setting a charge into movement in at least three degrees of freedom, comprising a triangular platform supporting a load.

The purpose of the present invention is to overcome these disadvantages. It relates to a system for generating movement of a support plate, the support plate being, in a so-called neutral position, substantially parallel to an XY plane defined by a so-called X direction and a so-called Y direction, said system being configured to be able to move said plate in at least some of the six degrees of freedom, said six degrees of freedom corresponding, respectively, to a so-called Xi translation along the X direction and a so-called θX rotation around this X direction, to a so-called Yi translation along the Y direction and a so-called θY rotation around this Y direction, to a so-called Zi translation along a so-called Z direction and a so-called θZ rotation around this Z direction, with the Z direction being orthogonal to said X and Y directions.

According to the invention, said system for generating movement comprises at least two control stages superimposed in a direction Z and being secured to each other, at least one of said control stages comprises a control module, and said at least one control module comprises only movement units designed so as to each generate a translational movement in the XY plane, and this respectively in different directions.

As such, thanks to the invention, as specified below, the system for generating movement is of the modular type. Due to this modular architecture and the use of movement units designed to generate only translational movements, a very compact system for generating movement is obtained as specified hereinafter. In addition, the system for generating movement has an extended area of work. This makes it possible to overcome the aforementioned disadvantages.

Advantageously, the movement units are arranged in the XY plane and positioned in such a way as to have different directions of translation that form, respectively, an angle of 120° between them.

In a preferred embodiment, a first control module comprises:

a first lower plate and a first upper plate;

at least two movement units, the movement units being fixed on an upper face of the first lower plate; and straight guide rails, each one of said guide rails being mounted on one of said movement units to which it is associated, each one of said guide rails being arranged orthogonally to the direction of movement of the associated movement unit and being designed in such a way as to move under the action of the associated movement unit, each one of said guide rails carrying a mobile carriage which is designed to be freely mobile orthogonally to the direction of movement of the associated movement unit, each one of said mobile carriages being connected to a lower face of the first upper plate.

In this case, in a first alternative embodiment, the first control module is designed to generate Xi and Yi movements and it comprises two movement units and a straight auxiliary guide rail, the auxiliary guide rail being arranged in a direction different from the directions of movement of the two movement units and carrying a mobile carriage designed to be freely mobile, the mobile carriage being fixed to the lower face of the first upper plate.

Furthermore, in a second alternative embodiment, the first control module is designed to generate Yi and θZ movements and it comprises two movement units and a straight auxiliary guide rail, the auxiliary guide rail being arranged in a direction different from the directions of movement of the two movement units and carrying a mobile carriage designed to be freely mobile, each one of said mobile carriages being provided with a rotation system designed to rotate freely in the XY plane, the three rotation systems being connected, each one, to the lower face of the first upper plate. In this case, advantageously, the system comprises an auxiliary control stage designed to generate an Xi movement of the so-called first control module.

Moreover, in a third (preferred) alternative embodiment, the first control module is designed to generate Xi, Yi and θZ movements, and it comprises:

three movement units; and three straight guide rails, each one of said guide rails being mounted on one of said movement units to which it is associated, each one of said guide rails being arranged orthogonally to the direction of movement of the associated movement unit and being designed in such a way as to move under the action of the associated movement unit, each one of said guide rails carrying a mobile carriage which is designed to be freely mobile orthogonally to the direction of movement of the associated movement unit, with each one of said mobile carriages being provided with a rotation system designed to be rotate freely in the XY plane, the three rotation systems being connected, each one, to the lower face of the first upper plate.

Moreover, in a preferred embodiment, a second control module is designed to generate θx, θY and Zi movements, and it comprises:

a second lower plate and a second upper plate;

three movement units designed so as to generate a translational movement, the movement units being fixed on an upper face of the second lower plate; and three straight guide rails, each one of said guide rails being mounted, inclined in relation to the XY plane, on one of said movement units to which it is associated, each one of said guide rails being arranged longitudinally to the direction of movement of the associated movement unit and being designed in such a way as to move under the action of the associated movement unit, each one of said guide rails carrying a mobile carriage which is designed to be freely mobile, with each one of said mobile carriages being provided with a ball designed to be freely rotating, the three balls being articulated, each one, to the lower face of the first upper plate.

In a first alternative embodiment, it additionally comprises, at least one, but preferably several of the following three auxiliary control stages:

an auxiliary control stage designed to generate an Xi movement;

an auxiliary control stage designed to generate a Yi movement; and an auxiliary control stage designed to generate a θZ movement.

Furthermore, in a second (preferred) alternative embodiment, the system for generating movement comprises only two control stages, of which a so-called first control stage comprises the so-called first control module designed to generate Xi, Yi and θZ movements, and of which a so-called second control stage comprises said second control module designed to generate θX, θY and Zi movements.

The accompanying figures will show how the invention can be implemented. In these figures, identical references designate similar elements.

Figure 1:
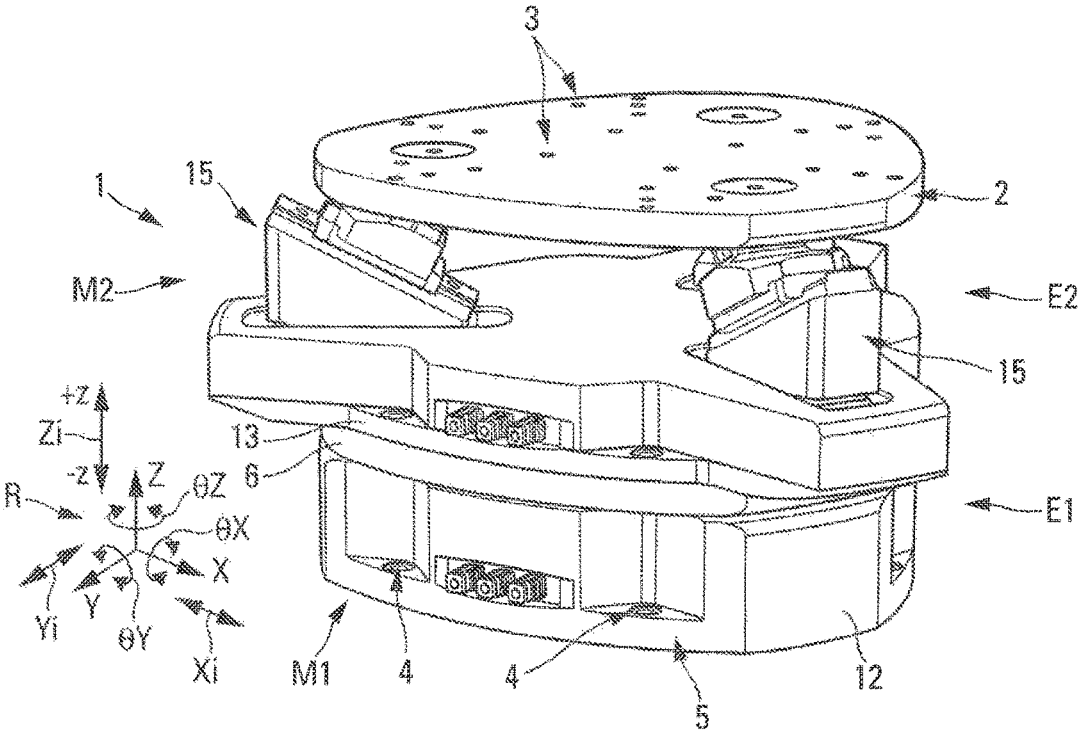
FIG. 1 is a perspective view of a preferred embodiment of a system for generating movement.

The system 1 shown in FIG. 1 and which illustrates the invention, is a system for generating a movement of a plate (or platform) 2, preferably globally flat, with respect to a support (not shown) whereon is placed (and in particular fixed) the system 1.

The plate 2, for example made of metal, is arranged substantially parallel to an XY plane defined by a so-called X direction (or longitudinal direction) and a so-called Y direction (or lateral direction), in a so-called neutral position of the plate 2, i.e. in a base position without activation of the various means of movement of the system 1 specified below.

These X and Y directions are part of a coordinate system R (or XYZ) which is shown in FIGS. 1, 2 and 5 to 7. This coordinate system R intended to facilitate understanding comprises, in addition to the X and Y directions (or axes) forming the XY plane, a so-called Z direction (or axis) (or vertical) which is orthogonal to said XY plane.

For reasons of clarity, the coordinate system R shown in detail in FIG. 1 is positioned outside of the system 1. However, the Z direction passes through a central vertical axis.

As indicated hereinabove, the support plate 2 is in the neutral position (not activated), substantially parallel to the XY plane. The system 1 is designed to be able to move said plate 2 in at least some of the six degrees of freedom.

These six degrees of freedom (shown as double arrows) correspond, respectively, as shown in FIG. 1 to a translation, named Xi, along the X direction;

to a so-called θX rotation, around the X direction;

to a translation, named Yi, along the Y direction;

to a so-called θY rotation, around the Y direction;

to a translation, named Zi, along the Z direction; and to a so-called θZ rotation, around the Z direction.

The adjectives "upper" and "lower" in the description hereinafter apply in relation to the directions defined by the arrow of the Z direction, upper being in the direction (+z) of the arrow and lower being in the opposite direction (−z), as shown in FIG. 1.

The plate 2 can support particular elements (not shown), which can be fixed on it, via fastening means, for example screws, passing through the holes 3 that can be seen in the plate 2 (FIG. 1).

In addition, the system 1 can be placed and fixed on a support element (not shown) via fastening means, for example screws, passing through the holes 4 that can be seen in a lower plate 5 of the system 1 (FIG. 1).

In a preferred application, the system 1 is part of a precise positioning device (or machine) for the semiconductor industry, in particular for processing or control applications in a standard atmosphere or in empty tanks, or for the optical and optoelectronics industry, for the positioning of optics, optoelectronic components, etc.

In a preferred embodiment, shown in FIG. 1, the system 1 comprises two control stages E1 and E2 superimposed in a direction Z and being secured to each other.

The system 1 is of the modular type, and each one of said control stages E1 and E2 comprises a control module M1 and M2.

In addition, each one of said control modules M1 and M2 comprises movement units U1 and U2 designed to each generate only a translational movement in the XY plane.

These movement units U1 and U2 which each comprise for example an electric motor or a motor of another type, can be controlled, usually, by an operator (or by an automatic control system), by the intermediary of a control element not shown. In particular, the distance and the direction of translation (in the direction considered), and possibly the speed of translation, can be controlled. Each [one ]of these movement units U1 and U2 therefore defines a [motorised] *motorized* axis (according to its direction (or axis) of translation). *Each movement unit (U1 and U2) includes a fixed portion and a movable portion. The fixed portion of each movement unit is configured to be fixed to a plate (e.g., the lower plate 5 for movement unit U1, or the lower plate 13*

Figure 6:
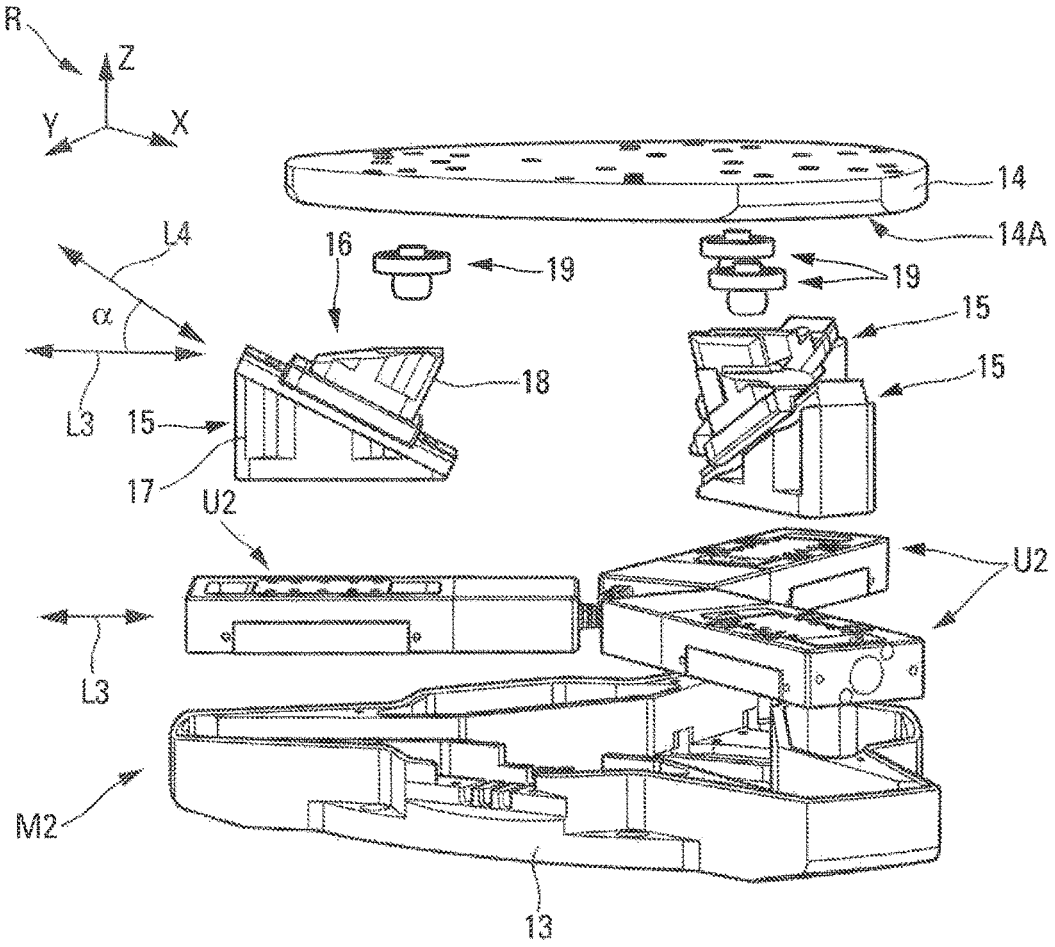
FIG. 6 is a perspective exploded view of the control module of FIG. 5.

*for movement unit U2). The movable portion of each movement unit is capable of reciprocal movement along a reciprocating direction (e.g., L3 as shown in FIG. 6) relative to the fixed portion of the movement unit. The movable portion of each movement unit is configured to carry a load (e.g., the straight guide rail 7 shown in FIG. 3, and the inclined guide rail 15) attached thereto.*

The sought position of the plate 2 is obtained by a particular combination of controls (and therefore of positioning) of the various movement units U1 and U2 considered.

In addition, the movement units U1 and U2 are designed to generate, each one, a translational movement, respectively in different directions. More precisely, the movement units U1 and U2 are arranged in the XY plane and positioned in such a way as to have different directions of translation that form, respectively, preferably an angle of 120° between them.

In the preferred embodiment, shown in FIG. 1, the system 1 comprises only the two control stages E1 and E2;

- of which the first lower control stage E1 comprises said control module M1, which is designed to generate Xi, Yi and θZ movements (i.e. translations in the X and Y directions and a rotation around the direction Z); and
- of which the second upper control stage E2 comprises said control module M2, which is designed to generate θx, θY and Zi movements.

Figure 2:
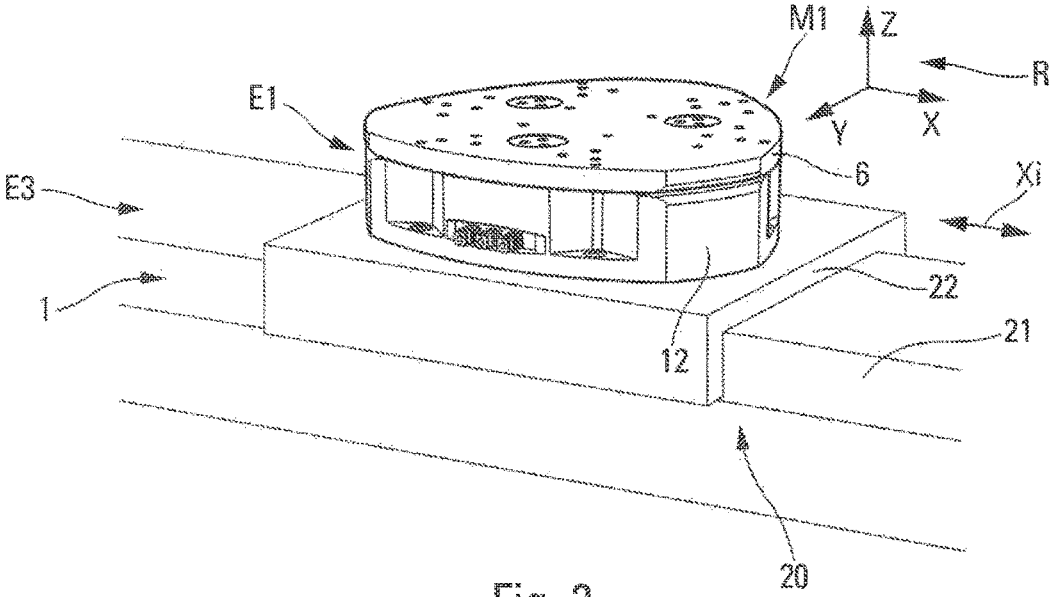
FIG. 2 is a perspective view, in a mounted position, of a first control module of the system for generating movement of FIG. 1, associated with an auxiliary control stage.
Figure 3:
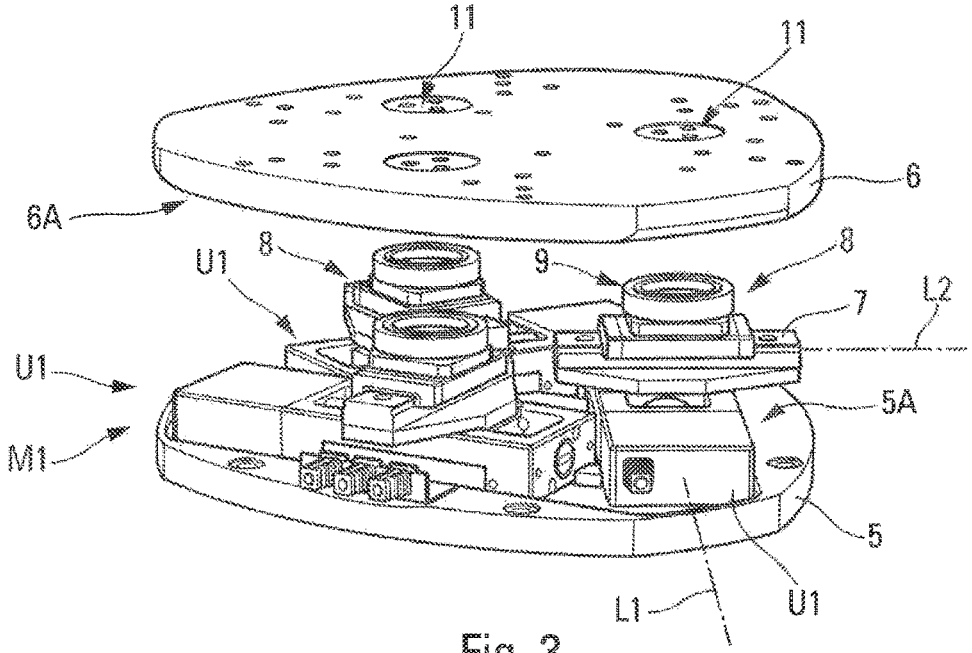
FIG. 3 is a partially exploded perspective view of the control module of FIG. 2.
Figure 4:
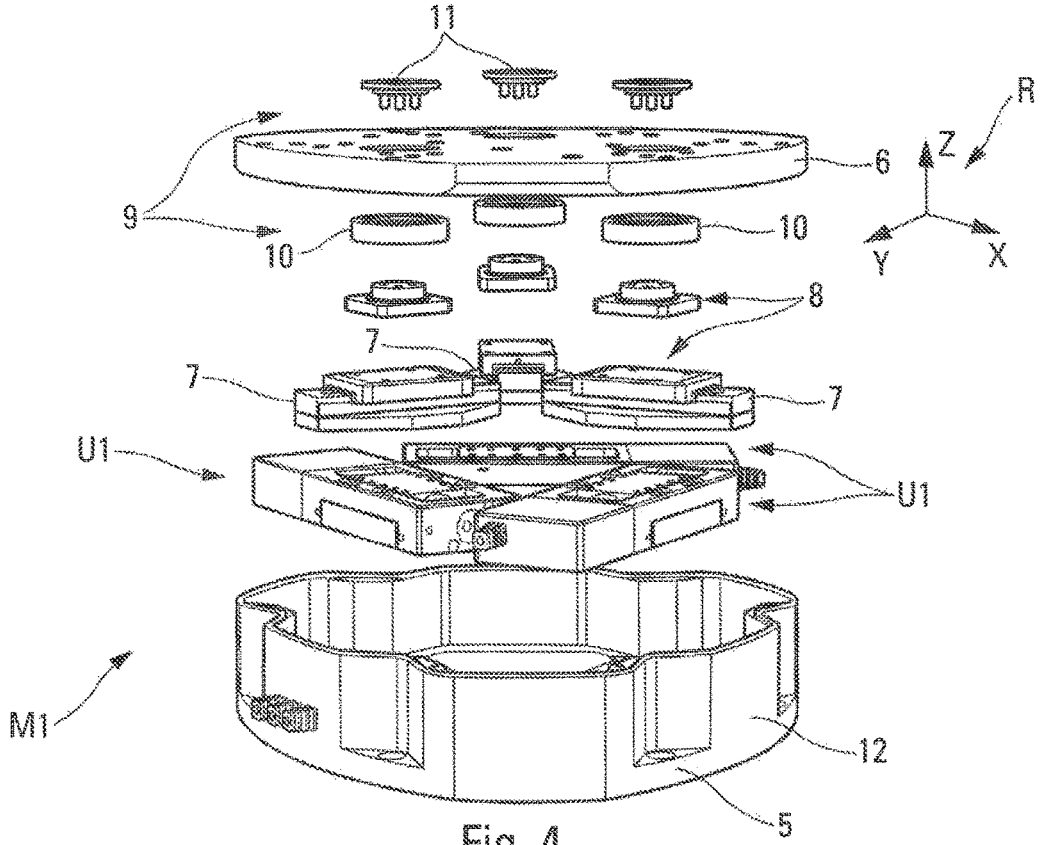
FIG. 4 is a perspective exploded view of the control module of FIG. 2.

More precisely, in a preferred embodiment, the control module M1 comprises, as shown in FIGS. 2 to 4:

- a lower plate 5 and an upper plate 6;
- three movement units U1. The three movement units U1 are fixed on an upper face 5A of the lower plate 5, as can be seen in FIG. 3; and
- the straight guide rails 7.

Each one of the three guide rails 7 is mounted on one of the three movement units U1, to which it is associated.

As such, the control module M1 comprises one guide rail 7 per movement unit U1 and each movement unit U1 is provided with a guide rail 7.

Each one of the *straight* guide rails 7 is arranged orthogonally to the direction of movement of the associated movement unit U1, as shown for a *straight* guide rail 7 on the right portion of FIG. 3, which comprises a longitudinal axis L2. This longitudinal axis L2 of the *straight* guide rail 7 is orthogonal to the longitudinal axis (or axis of movement) L1 of the movement unit U1. *As such, each one of the straight guide rails 7 has a sliding direction along the longitudinal axis L2, orthogonal to direction of movement of the associated movement unit U1.*

Each one of the guide rails 7 is designed in such a way as to be moved (in the L1 direction) under the action of the associated movement unit U1.

Furthermore, each one of the guide rails 7 carries a mobile carriage 8. This mobile carriage 8 is designed to be freely mobile in the direction L2, i.e. orthogonally to the direction of movement L1 of the associated movement unit U1.

Moreover, each one of the mobile carriages 8 is provided with a rotation system 9 comprising, preferably, a ball bearing 10, which is designed to freely rotate in the plane of the upper plate 6 corresponding to the XY plane in the neutral position.

The three rotation systems 9 are each connected to the lower face 6A of the upper plate 6, by the intermediary of usual fastening elements 11 arranged in the upper plate 6.

In addition, the control module M1 comprises a closed side wall 12, which is integral with the lower plate 5, as shown in FIG. 4.

Consequently, a command by an operator or an automatic control system of a movement unit U1 generates the movement of the guide rail 7. During this movement of the guide rail 7, the mobile carriage 8 can be moved freely and act on the position of the upper plate 6.

Figure 5:
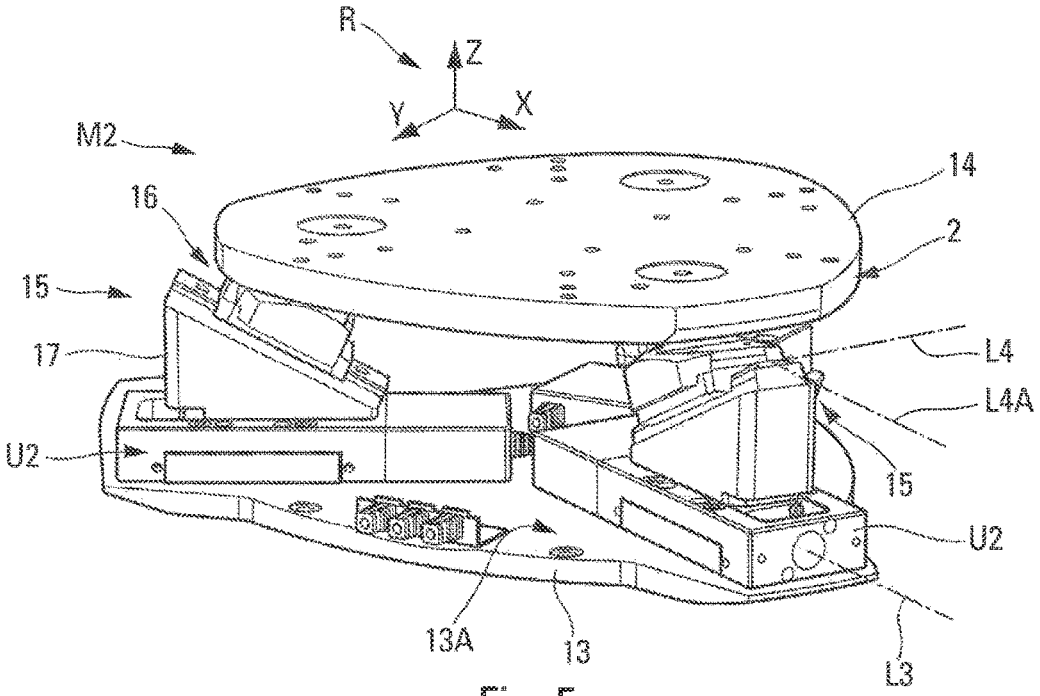
FIG. 5 is a perspective view of a second control module of the system for generating movement of FIG. 1.
Figure 7:
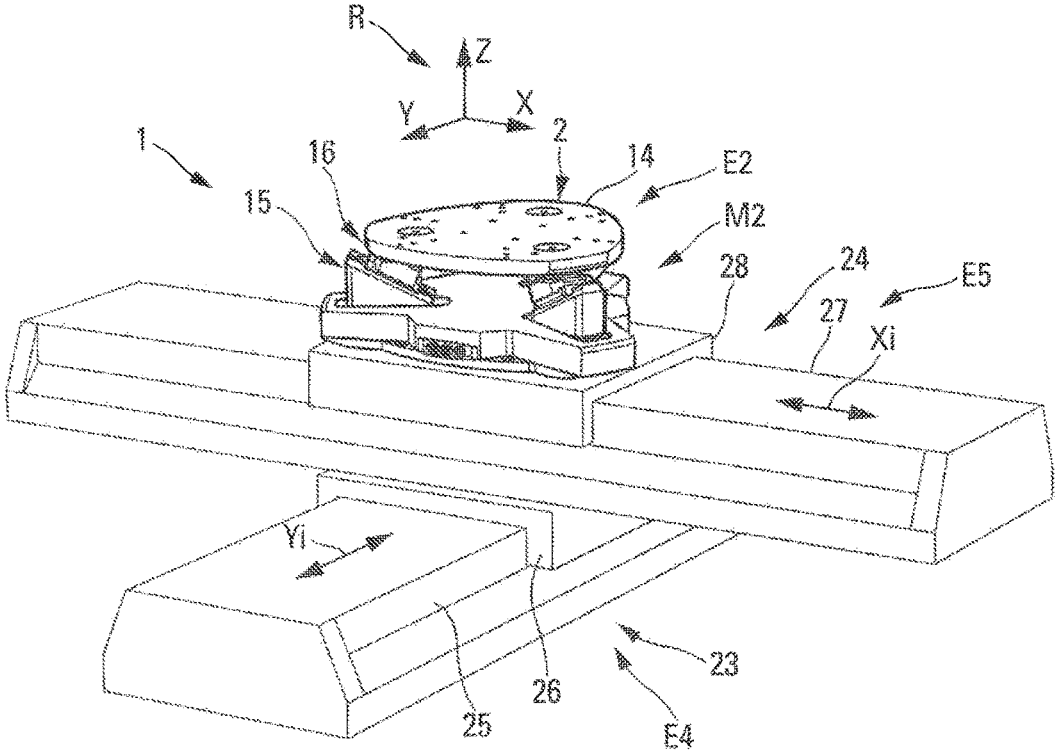
FIG. 7 is a perspective view of the control module of FIG. 5, associated with two auxiliary control stages.

Moreover, in a preferred embodiment, the second control module M2 comprises, as shown in FIGS. 5 to 7:

- a lower plate 13 and an upper plate 14 (which corresponds to the plate 2 or to a plate whereon is fixed the plate 2);
- three movement units U2 designed to generate a translational movement. The three movement units U2 are fixed on an upper face 13A (FIG. 5) of the lower plate 13. The movement units U2 are, preferably, similar to the movement units U1 of the control module [M1] *U1*; and
- three straight guide rails 15.

Each one of the three guide rails 15 is mounted on one of the three movement units U2, to which it is associated. As such, the control module M2 comprises one guide rail 15 per movement unit U2 and each movement unit U2 is provided with a guide rail 15.

Each one of the movement units U2 is fixed on the upper face 13A in order to generate a movement in a given direction in the XY plane, as shown by the L3 direction for the movement unit U2 which can be seen on the right of FIG. 5.

Furthermore, each one of the guide rails 15 is arranged longitudinally to the direction of movement L3 of the associated movement unit U2. In addition, it is designed in such a way as to be moved under the action of the associated movement unit U2. *As such, each of the guide rails 15 has a sliding direction arranged longitudinally to the direction of movement L3 of the associated movement unit U2 and disposed at an angle relative to the XY plane.*

Moreover, each one of the guide rails 15 carries a mobile carriage 16 which is designed to be freely mobile. Each one of the guide rails 15 is mounted inclined, in the Z vertical direction with respect to the associated guide rail.

As shown in FIG. 6, in an XZ or YZ vertical plane, the direction of movement L4 of the freely mobile carriage 16 has an angle α, non-zero with respect to the direction of movement of the guide rail 15 (under the action of the movement unit U2). To achieve this, the guide rail 15 is connected to the movement unit U2 via a bevelled support element 17 with a triangular shape in the vertical plane.

Due to its positioning on the movement unit U2, the mobile carriage [17] *16* is moved in the XY plane in the L3 direction. As shown in FIG. 5, the projection L4A of the L4 direction of movement in the XY plane, is parallel (or confounded) with the L3 direction.

Moreover, the mobile carriage 16 comprises a bevelled support element 18, that cooperates with the bevelled support element 17, and which is adapted to the latter so that the upper face of the support element 18 is substantially parallel to the lower face of the support element 17.

Furthermore, each one of the carriages 18 is provided with a ball 19 designed to be freely rotating.

The three balls 19 are each mounted articulated to the lower face 14A of the upper plate 14.

Due in particular to its modular architecture and to the use of movement units U1 and U2 designed to generate only translational movements, the system 1 (for generating movement) such as described hereinabove is very compact, and in addition, it has an extended area of work, in particular in relation to the usual systems (in particular of the hexapod type).

In the preferred embodiment of the system 1 such as described hereinabove and shown in FIG. 1, said system 1 comprises two control stages E1 and E2 comprising, respectively, the control modules M1 and M2 such as described hereinabove.

However, in the framework of this invention, and as specified below:

- the control module M1 can be carried out differently, in particular by modifying at least one of its characteristics, in particular when it must implement only some of the Xi, Yi and θZ movements; and
- the system for generating movement 1 can comprise only one of these two control modules M1 and M2, which is then associated with one or several auxiliary control stages.

As such, in a first alternative embodiment with respect to that of the aforementioned FIGS. 2 to 4, the control module M1 is designed to generate only Xi and Yi movements.

In this first alternative embodiment (specifically not shown), the control module M1 comprises only two movement units U1, as well as a straight auxiliary guide rail. This auxiliary guide rail replaces the third movement unit U1 of the embodiments of FIGS. 2 to 4.

The auxiliary guide rail is arranged in a direction different from the directions of movement of the two movement units and identical to that of the third movement unit of FIGS. 2 to 4.

In addition, the guide rail carries a mobile carriage designed to be freely mobile, and the auxiliary guide rail is arranged in such a way that the mobile carriage can be moved, freely, in the direction of movement of said third replaced movement unit.

The three mobile carriages are directly fixed on the lower face 6A of the upper plate 6 and are not provided with a rotation system.

The movement module in accordance with this first alternative embodiment can be associated within a system for generating movement:

- with a first auxiliary control stage, which is designed to generate, in a usual manner, a θZ movement in such a way as to obtain a system for generating Xi, Yi and θZ movements;
- with a second auxiliary control stage, which is designed to generate, in a usual manner, a Zi movement in such a way as to obtain a system for generating movements in Xi, Yi and Zi; or
- simultaneously to said first and second auxiliary control stages.

Furthermore, in a second alternative embodiment, the first control module M1 is designed to generate only Yi and θZ movements.

In this second alternative embodiment, the control module M1 comprises two movement units U1, as well as a straight auxiliary guide rail.

The auxiliary guide rail is arranged in a direction different from the directions of movement of the two movement units and identical to that of the third movement unit of FIGS. 2 to 4.

In addition, the auxiliary guide rail as well as the two movement units each carries a mobile carriage designed to be freely mobile.

In this case, each one of the three mobile carriages, similar for example to the mobile carriage 8, is provided with a rotation system designed to be freely rotating in the plane XY, such as the aforementioned rotation system 9.

In addition, the three rotation systems are each connected to the lower face 6A of the upper plate 6A.

In association with this second embodiment, the system 1 can comprise, in a particular embodiment, an auxiliary control stage E3 shown as a thin line (for the purpose of illustration) in FIG. 2. This auxiliary control stage E3 is designed to generate an Xi movement of said control module M1.

This auxiliary control stage E3 can comprise a movement element 20 in order to generate the Xi movement. In a particular embodiment, the movement element 20 is provided with a guide rail 21 carrying a mobile carriage 22, and means for controlling the movement (not shown) of the mobile carriage 22 on the guide rail 21, such as an electric motor for example.

The mobile carriage 22 is therefore mounted mobile on the guide rail 21 and it carries the control module M1 in accordance with the second alternative embodiment.

Moreover, in another alternative embodiment (shown in FIGS. 7 and 8), the system for generating movement comprises, associated with the control module M2, instead of the control module M1, at least one (but preferably several) of the following three auxiliary control stages:

- an auxiliary control stage E5 designed to generate an Xi movement;
- an auxiliary control stage E4 designed to generate a Yi movement; and
- an auxiliary control stage E6 designed to generate a θZ movement.

All of the combinations of the control module M2 with one or several of the auxiliary control stages E4 to E6 are possible, according to the applications considered (and of the movements that are to be controlled).

As such, in a first embodiment shown in FIG. 7, the system for generating movement comprises the two auxiliary control stages E4 and E5, which are shown as a thin line in this FIG. 7.

The auxiliary control stage E4 can comprise a movement element 23 in order to generate the Yi movement. In a particular embodiment, the movement element 23 is provided with a guide rail 25 carrying a mobile carriage 26, and means for controlling the movement (not shown) of the mobile carriage 26 on the guide rail 25, such as an electric motor for example, which can be controlled, in a usual manner, by an operator or by an automatic control system. The mobile carriage 26 is therefore mounted mobile on the guide rail 25 and it carries the auxiliary control stage E5.

The auxiliary control stage E5 can comprise a movement element 24 in order to generate the Xi movement. In a particular embodiment, the movement element 24 is also provided with a guide rail 27 also carrying a mobile carriage 28, and means for controlling the movement (not shown) of the mobile carriage 28 on the guide rail 27, such as an electric motor for example, which can be controlled, usually, by an operator or by an automatic control system. The mobile carriage 28 is therefore mobile on the guide rail 27 and it carries the control module M2.

The system for generating movement according to this first embodiment is therefore able to generate Xi, Yi, Zi, θX and θY movements.

Figure 8:
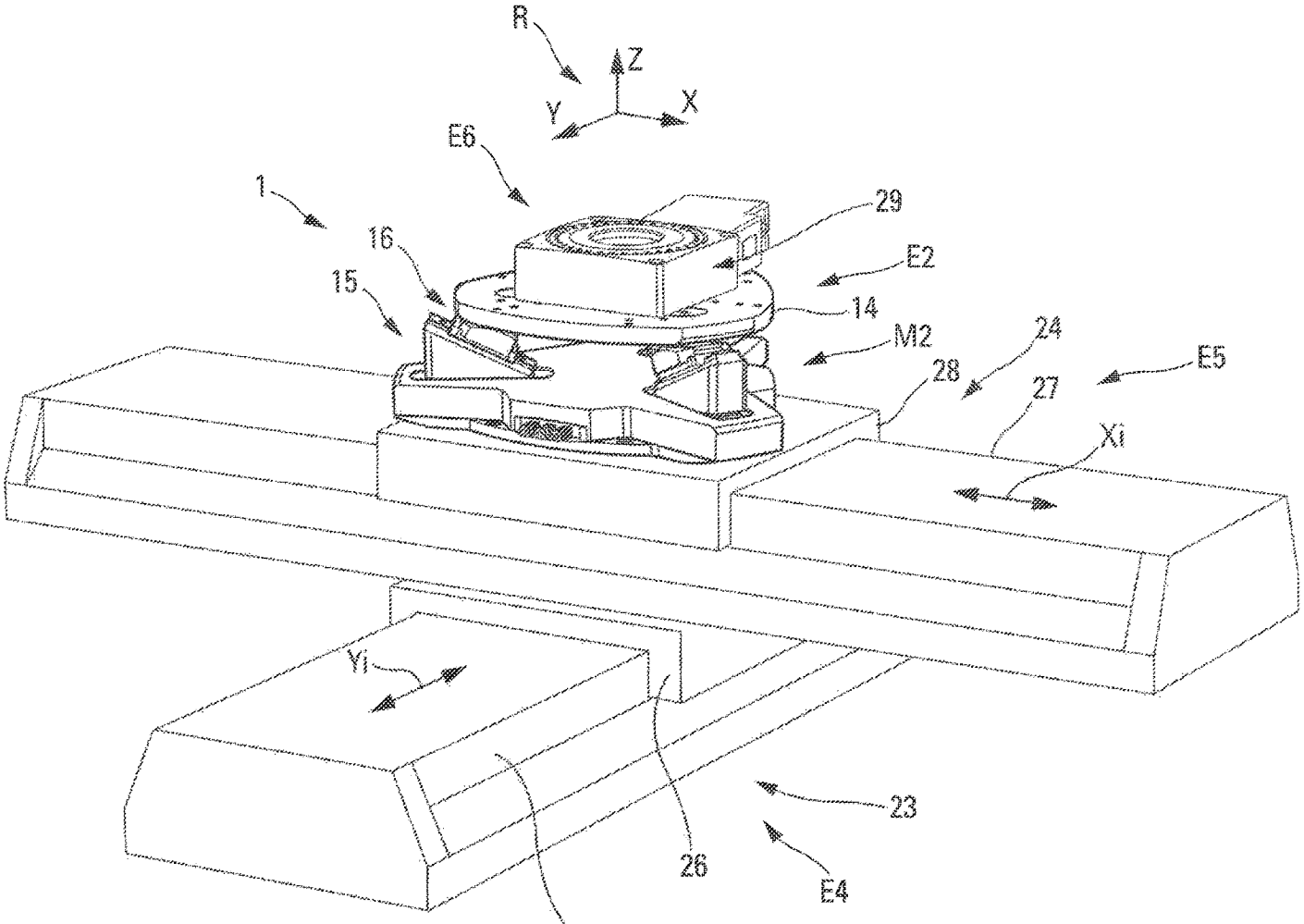
FIG. 8 is a perspective view of the control module of FIG. 5, associated with three auxiliary control stages.

Furthermore, in a second preferred embodiment, shown in FIG. 8, the system for generating movement comprises, associated with the control module M2, simultaneously the three auxiliary control stages E4, E5 and E6, which are shown as a thin line in this FIG. 8. The auxiliary control stages E4 and E5 are similar to those of FIG. 7.

As for the auxiliary control stage E6, it can comprise an element for driving a rotation 29, for example a motor, in order to generate the θZ movement, i.e. in order to generate a rotation around the Z axis. In the example shown in FIG. 8, the element for driving a rotation 29 (which can usually be controlled by an operator or by an automatic control system), is mounted on the upper plate 14 of the control module M2.

The system for generating movement according to this second embodiment is therefore able to generate the Xi, Yi, Zi, θX, θY and θZ movements (i.e. movements in six degrees of freedom).

The invention claimed is:

1. A system for generating movement of a support plate [in a neutral position, substantially parallel to an XY plane defined by] *along* an X direction and a Y direction *relative to an XY plane*, [said system configured to move said support plate in at least one of six degrees of freedom, corresponding, respectively, to an Xi translation along the X direction and a θX rotation around said X direction, to a Yi translation along the Y direction and a θY rotation around said Y direction, to a Zi translation along a Z direction and a θZ rotation around said Z direction, with the Z direction being orthogonal to said X and Y directions,] said system comprising:

[at least] two control stages carrying the support plate, the control stages superimposed in the Z direction and being secured to each other, at least one of said control stages comprising a first control module configured to generate a translational movement of the support plate [in only] *parallel to* the XY plane, wherein the first control module comprises:

a first lower plate having an upper face;

a first upper plate having a lower face spaced [a distance] *apart* from and opposing the upper face, the first upper plate movingly associated with the support plate;

[at least] two movement units [having a movable portion capable of reciprocal] *configured to generate translational* movement along a [reciprocating] direction *of movement*, the [at least] two movement units fixed on the upper face of the first lower plate;

a straight guide rail coupled to [the movable portion of] each one of said movement units, such that the straight guide rail moves with the [reciprocal] movement of the [movable portion] *movement unit*, each straight guide rail having a sliding direction arranged orthogonally to the [reciprocating] direction *of movement*; and a mobile carriage slidably coupled to each one of the straight guide rails and configured to freely slide along the associated straight guide rail in the sliding direction, each *mobile* carriage coupled to the lower face of the first upper plate, such that the [reciprocal] *translational* movement of the [movable portions] *movement units* creates the translational movement of the first upper plate and, thereby, translational movement of the support plate.

2. The system of claim 1, wherein the movement units are arranged [such that the reciprocating direction of each movable portion is] in the XY plane [having] *and positioned to have different directions of translation that form, respectively* an angle of 120° therebetween.

3. The system of claim 1, wherein the first control module is configured to generate Xi and Yi movement of the support plate, the system further comprising:

a third movement unit [having a movable portion capable of reciprocal] *configured to generate translational* movement along a [reciprocating] direction *of movement*, the third movement unit fixed on the upper face of the first lower plate;

a straight auxiliary guide rail coupled to the [movable portion of the] third movement unit, such that the straight auxiliary guide rail moves with the [reciprocal] *translational* movement of the movable portion of the third movement unit, the straight auxiliary guide rail having an auxiliary sliding direction different from both of the [reciprocating directions] *direction* of the two movement units; and an auxiliary mobile carriage slidably coupled to the straight auxiliary guide rail and configured to freely slide in the auxiliary sliding direction, the auxiliary mobile carriage fixed to the lower face of the first upper plate.

4. The system of claim 3, wherein each one of said mobile carriages [comprising] *is provided with* a rotations system coupled to the lower face of the first upper plate and configured to generate θZ rotation in the first upper plate and, thereby, generate θZ rotation in the support plate.

5. The system of claim 1, wherein each one of said mobile carriages [comprise] *is provided with* a rotation system coupled to the lower face of the first upper plate and configured to generate θZ rotation in the first upper plate and, thereby, generate θZ rotation in the support plate.

6. The system of claim 5, further comprising an auxiliary control stage configured to generate an Xi movement of the first control module.

7. The system of claim 1, further comprising a second control module configured to generate θX, θY, and Zi movements, the second control module comprising:

a second lower plate having an upper face;

[a] *the* second upper plate having a lower face spaced [a distance] *apart* from and opposing the upper face of the second lower plate, the second upper plate movingly associated with the support plate;

three movement units [each having a movable portion capable of reciprocal] *configured to generate translational* movement along a [reciprocating] direction *of movement*, the three movement units fixed on the upper face of the second lower plate;

an inclined guide rail coupled to [the movable portion of] each one of the movement units such that each inclined guide rail moves with the [reciprocal] *translational* movement [of the movable portion] of the three movement units, each inclined guide rail having a sliding direction arranged longitudinally to the [reciprocating] direction *of movement* and disposed at an angle with respect to the XY plane; and a mobile carriage slidably coupled to each one of the inclined guide rails and configured to freely slide along the associated inclined guide rail in the sliding direction, each one of said mobile carriages comprising a ball configured to rotate with respect to the associated mobile carriage, each ball articulated to the lower face of the first upper plate, such that [reciprocal movement of the movable portions] *the translational movement* of the three movement units generates the θX, θY, and Zi movements of the second upper plate and, thereby, θX, θY, and Zi movement of the support plate.

8. The system of claim 7. further comprising at least one of the following three auxiliary control stages:

an auxiliary control stage configured to generate an Xi movement of the first and second control modules;

an auxiliary control stage configured to generate a Yi movement of the first and second control modules; and an auxiliary control stage configured to generate a θZ movement of the first and second control modules.

*9. A system for generating Xi and Yi movements of a first upper plate relative to an XY plane, the Xi and Yi movements parallel to the XY plane, the system comprising:*

*a first control module configured to generate a translational movement in the XY plane, wherein the first control module comprises:*

*a first lower plate having an upper face;*

*the first upper plate having a lower face spaced apart from and opposing the upper face of the lower plate;*

*two movement units fixed to the upper face of the first lower plate, each movement unit configured to generate translational movement along a direction of movement;*

*a straight guide rail coupled to each of the movement units, such that the straight guide rail moves with the movement of the movement unit, each straight guide rail having a sliding direction arranged orthogonally to the direction of movement; and*

*a mobile carriage slidably coupled to each of the straight guide rails and configured to be freely mobile along the associated straight guide rail in the sliding direction, each mobile carriage coupled to the lower face of the first upper plate, such that translational movement of the movement units creates the translational movement of the first upper plate.*

*10. The system of claim 9, wherein the movement units are arranged in the XY plane and positioned to have different directions of translation that form, respectively, an angle of 120° therebetween.*

*11. The system of claim 9, wherein the first control module is configured to generate Xi and Yi movement, the system further comprising:*

*a third movement unit configured to generate translational movement along a direction of movement, the third movement unit fixed on the upper face of the first lower plate;*

*a straight auxiliary guide rail coupled to the third movement unit, such that the straight auxiliary guide rail moves with the translational movement of the third movement unit, the straight auxiliary guide rail having an auxiliary sliding direction different from both the direction of movement of the two movement units; and*

*a mobile carriage slidably coupled to the straight auxiliary guide rail and configured to be freely mobile in the auxiliary sliding direction, the mobile carriage fixed to the lower face of the first upper plate.*

*12. The system of claim 11, wherein each one of the mobile carriages is provided with a rotation system coupled to the lower face of the first upper plate and configured to generate θZ rotation in the first upper plate.*

*13. The system of claim 9, wherein each one of the mobile carriages is provided with a rotation system coupled to the lower face of the first upper plate and configured to generate θZ rotation of the first upper plate.*

*14. The system of claim 13, further comprising an auxiliary control stage configured to generate an Xi movement of the first control module.*

*15. The system of claim 9, further comprising a second control module configured to generate θX, θY, and Zi movements relative to an XY plane, the second control module comprising:*

*a second lower plate having an upper face;*

*a second upper plate;*

*three movement units fixed to the upper face of the second lower plate, each movement unit configured to generate translational movement along a direction of movement;*

*an inclined guide rail coupled to each one of the movement units such that each inclined guide rail moves with the translational movement of the associated movement unit, each inclined guide rail having a sliding direction arranged longitudinally to the direction of movement and disposed at an angle with respect to the XY plane; and*

*a mobile carriage slidably coupled to each one of the inclined guide rails and configured to be freely mobile along the associated inclined guide rail in the sliding direction, each one of the mobile carriages being provided with a ball configured to rotate with respect to the associated mobile carriage, each ball articulated to a lower face formed on the second upper plate, such that translational movement of the three movement units generates the θX, θY and Zi movements of the second upper plate.*

*16. The system of claim 15, further comprising at least one of the following auxiliary control stages:*

*an auxiliary control stage configured to generate an Xi movement of at least one of the first or second control modules;*

*an auxiliary control stage configured to generate a Yi movement of at least one of the first or second control modules; and*

*an auxiliary control stage configured to generate a θZ movement.*

*17. A system for generating θX, θY and Zi movements relative to an XY plane, the θX movement around an X direction parallel to the XY plane, the θY movement around a Y direction parallel to the XY plane, the Zi movement along a Z direction orthogonal to the XY plane, the system comprising:*

*a lower plate having an upper face;*

*an upper plate;*

*three movement units fixed to the upper face of the lower plate, each movement unit configured to generate movement along a direction of movement parallel to the XY plane;*

*an inclined guide rail coupled to each one of the movement units such that each inclined guide rail moves with the translational movement of the associated movement unit, each inclined guide rail having a sliding direction arranged longitudinally to the direction of movement and disposed at an angle with respect to the XY plane; and*

*a mobile carriage coupled to each one of the inclined guide rails and configured to be freely mobile along the associated inclined guide rail in the sliding direction, each one of the mobile carriages comprising a ball configured to rotate with respect to the associated mobile carriage, each ball articulated to the upper plate, such that translational movement of the three movement units generates the θX, θY and Zi movements.*

*18. The system of claim 17, wherein the movement units are arranged in the XY plane and positioned to have different directions of translation that form, respectively, an angle of 120° between them.*

*19. The system of claim 17, wherein the inclined guide rail is coupled to each of the movement units via a beveled support element.*

*20. The system of claim 17, further comprising at least one of the following auxiliary control stages:*

*an auxiliary control stage configured to generate an Xi movement of the system, wherein the system is carried by the auxiliary control stage;*

*an auxiliary control stage configured to generate a Yi movement of the system, wherein the system is carried by the auxiliary control stage; and*

*an auxiliary control stage configured to generate a θZ movement, wherein the auxiliary control stage configured to generate a θZ movement is mounted on the upper plate of the system.*

*21. The system of claim 20, wherein the auxiliary control stage configured to generate the Xi movement is carried by the auxiliary control stage configured to generate the Yi movement.*

*22. The system of claim 20, wherein the auxiliary control stage configured to generate the Yi movement is carried by the auxiliary control stage configured to generate the Xi movement.*

* * * * *